(12) United States Patent
Garcia

(10) Patent No.: US 7,699,596 B2
(45) Date of Patent: Apr. 20, 2010

(54) APPARATUS FOR LOWERING ENERGY CONSUMPTION OF A POLYMER COMPOUNDING PROCESS

(76) Inventor: Rod A. Garcia, 17884 Mail Route Rd., Montgomery, TX (US) 77316

( * ) Notice: Subject to any disclaimer, the term of this patent is extended or adjusted under 35 U.S.C. 154(b) by 629 days.

(21) Appl. No.: 11/295,193

(22) Filed: Dec. 6, 2005

(65) Prior Publication Data

US 2007/0001339 A1 Jan. 4, 2007

Related U.S. Application Data

(60) Provisional application No. 60/696,012, filed on Jul. 2, 2005, provisional application No. 60/724,371, filed on Oct. 8, 2005.

(51) Int. Cl.
*B29C 47/00* (2006.01)
(52) U.S. Cl. .................................. 425/308; 425/378.1

(58) Field of Classification Search ................. 425/113, 425/308, 310, 378.1, 315
See application file for complete search history.

(56) References Cited

U.S. PATENT DOCUMENTS

| 4,591,467 A | | 5/1986 | Kopernicky |
| 4,632,564 A | | 12/1986 | Kopernicky |
| 4,882,105 A | | 11/1989 | Volk, Jr. |
| 5,942,170 A | * | 8/1999 | Peitz ........................ 264/40.6 |
| 6,755,640 B2 | * | 6/2004 | Bauer et al. ................. 425/551 |
| 2003/0082265 A1 | | 5/2003 | Bauer et al. |

* cited by examiner

*Primary Examiner*—Joseph S. Del Sole
*Assistant Examiner*—John P Robitaille
(74) *Attorney, Agent, or Firm*—Conley Rose, P.C.

(57) ABSTRACT

In apparatus and processes for producing pellets of plastic resins and additives, the heat collected in the quench water of the pelletizer device is used to heat the plastic entering the process. This simple unique idea has an energy saving in the process.

5 Claims, 8 Drawing Sheets

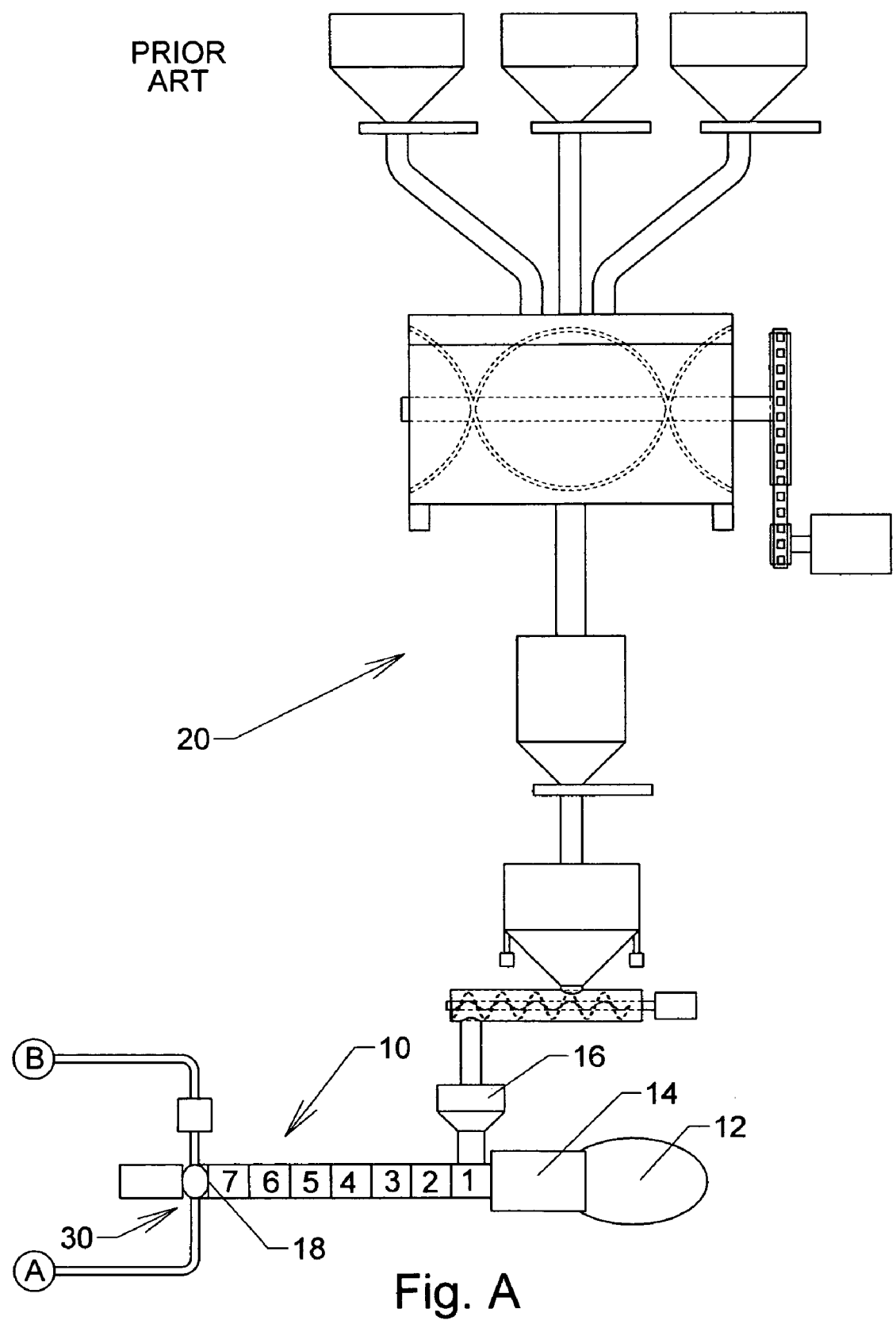
Fig. A

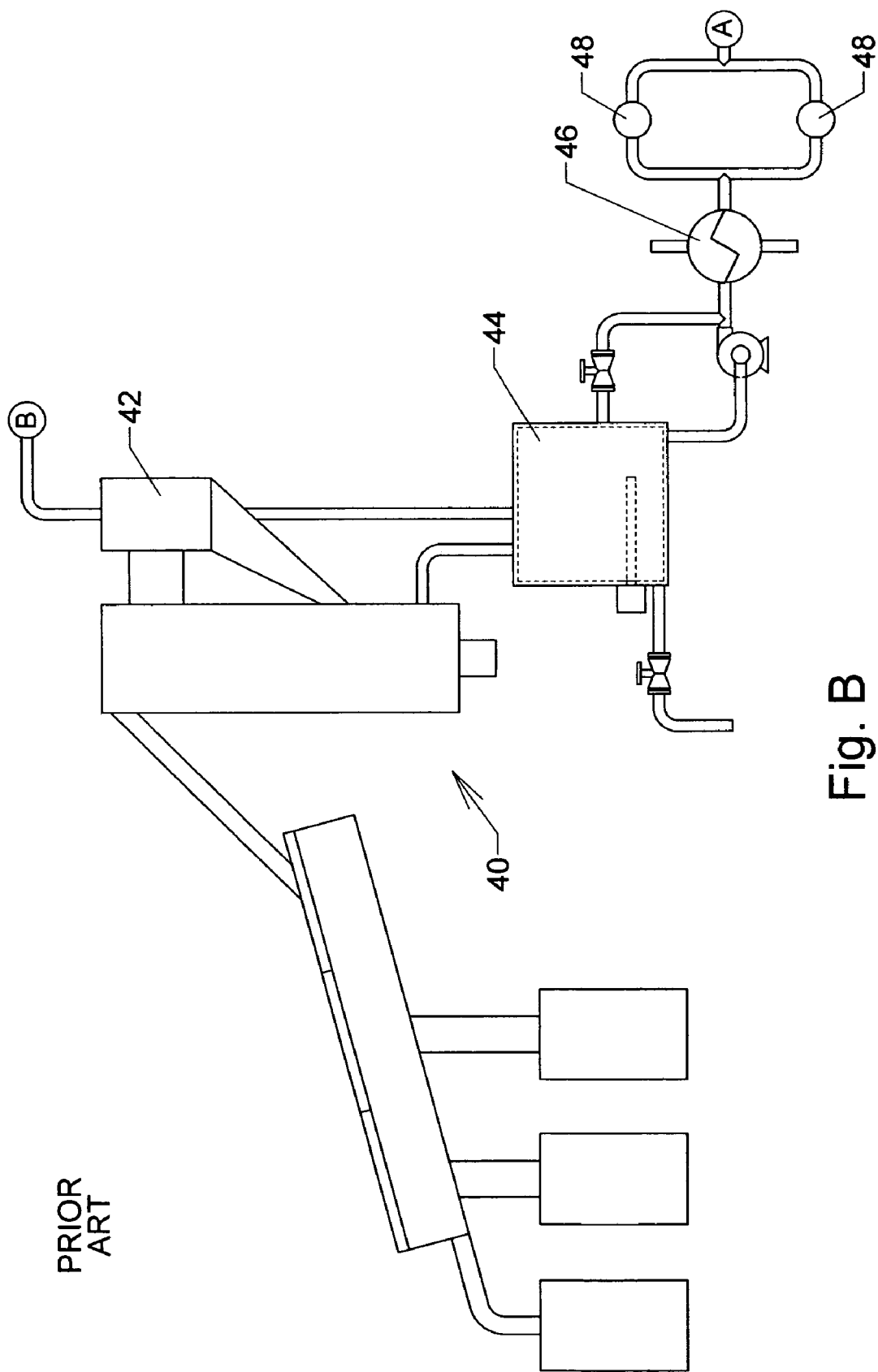
Fig. B
PRIOR ART

APPARATUS FOR LOWERING ENERGY CONSUMPTION OF A POLYMER COMPOUNDING PROCESS

RELATED APPLICATIONS

This application is based on Provisional Application 60/696,012, filed Jul. 2, 2005, entitled "Energy Savings" and Provisional Application 60/724,371, filed Oct. 8, 2005, also entitled "Energy Savings".

FIELD OF INVENTION

The present invention is directed to an extruder/pelletizing process to compound plastic resin. More specifically, the present invention is directed to apparatus and processes to take the quench water that cools the plastic extrudate that forms the pellets and becomes hot and use this hot water to heat the plastic entering the process.

BACKGROUND OF THE INVENTION

The present invention is directed to the compounding of plastic pellets, where one or more plastic resins and one or more additives are melted and mixed in a compounding extruder. In the present methods of compounding and forming plastic pellets, the heat generated in cooling the extrudate that forms the pellets is thrown away. The prior art method of forming plastic pellets is illustrated in the schematic drawings labeled FIG. A and FIG. B.

Referring to FIG. A, extruder 10 is a single screw or double screw compounding extruder powered preferably by a DC motor 12 and a gear drive 14. Extruder 10 has a plurality of zones, seven (7) being shown. The zones are heated by heaters (not shown) on the external surface of extruder 10. A feed hopper 16 is located at the near end of extruder 10, near the first of the internal zones, usually near the first or second zone. The temperature within the extruder 10 usually increases as the plastic resin and additives advance from the first to last zone, and the plastic resin that is introduced as a solid is melted to a point that the additive(s) are homogeneously mixed in the plastic resin. Extruder 10 has a die 18 having a plurality of holes through which the mixed plastic and additive(s) flow as an extrudate. Above the feeder hopper 16 of extruder 10 is shown feed handling equipment 20, the details of which are immaterial to the description of the prior art. Extruder 10 has a pelletizer device 30 at the terminal end. Illustrated is an underwater pelletizer characterized by structure that brings cool water from inlet "A" through a chamber with a rotating cutter that cuts the extrudate immediately as the extrudate passes through die 18, cooling the cut extrudate as a pellet and removes the quench water, that is now hot, and the pellets through outlet "B".

Referring now to FIG. B, the slurry of pellets in the quench water from extruder 10 and pelletizer 30 enter through "B" into equipment 40 for pellet recovery. The pellets are separated from the water in a de-watering box 42 and the water collected in water tank 44. The water exits water tank 44 and is passed through a heat exchanger 46, which may be a chiller or cooling towers, to reduce the temperature of the water. In the prior art, this heat is essentially thrown away. The heat must be removed since the water is re-circulated, after passing though filters 48 to exit "A" for use in the pelletized 30 as shown in FIG. A.

SUMMARY OF THE INVENTION

In contrast to the apparatus and processes of the prior art for producing pellets of plastic resins and additives, the heat collected in the quench water of the pelletizer devices is used to heat the plastic entering the process. This simple unique idea has an energy saving in the process.

BRIEF DESCRIPTION OF THE DRAWINGS

FIG. A is a schematic view of a prior art compounding extruder with a pelletizer at the terminal end of the extruder.

FIG. B is a schematic view of a prior art pellet recovery equipment.

BRIEF DESCRIPTION OF THE EMBODIMENTS OF THE INVENTION

The present invention is directed to energy savings and/or conservation in a compounding process where plastic resins and additives are pelletized in an extruder/pelletizer apparatus and/or method. In contrast to the prior art processes and apparatus, the quench water that cools the plastic extrudate that forms the pellets and becomes hot in the pelletizer is used to heat the plastic entering the process.

Plastic materials that can benefit from the present invention in the compounding and/or pelletizing include but are not limited to materials such as polyethylene (PE), polypropylene (PP), nylon, acetal, polyvinyl chloride (PVC), polyvinylidene chloride, polystyrene, polycarbonate, polyisoprene, polymethyl methacrylate (PMMA), polyethylene terephthalate (PET), polyethylene oxide (PEO), polymethylene oxide (PMO), polypropylene oxide (PPO), polyoxyethylene (POE), polyacrylonitrile, polypentadiene, polychloroprene, polyetheretherketone (PEEK), polyimide, polyetherimide (PEI), polybutene-1, polybutylene terephthalate (PBT), polypropylene sulfide (PPS), polyethylene sulfide (PES), poly(phenylene) sulfide (PPS), polysulfone, polypropylene sulfone, polyalphamethylstyrene, polyvinylidene alcohol, polyvinyl alcohol, polyvinyl acetate, polyvinyl acetal, and the like. In the compounding process, additives that may benefit from the use of the present invention include but are not limited to materials such as stabilizers, coloring agents, property enhancers, end use enhancers, property modifiers, and the like.

Figure 1:
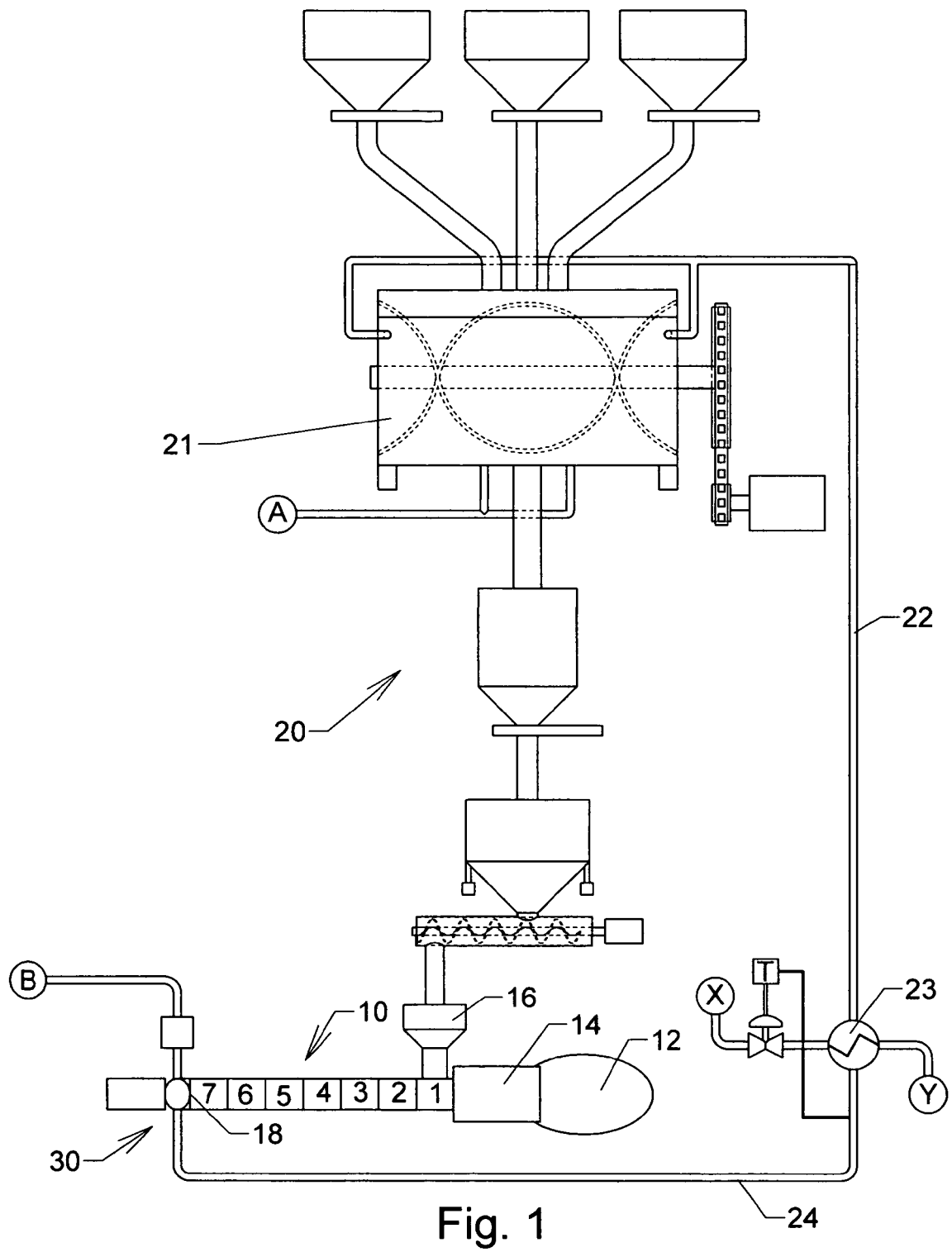
FIG. 1 is a schematic view of a compounding extruder with a pelletizer at the terminal end of the extruder and one embodiment of feed handling equipment used in the present invention where the heated quench water used with the pelletizer device is used to heat or preheat the plastic entering the process.

Referring now to FIG. 1, extruder 10 is powered by a motor 12 and gear drive 14. A feed hopper 16 is located at the near end of extruder 10. Plastic resin (that may be in the form of pellets, chips or powder and may be a single plastic or a mixture of more than one plastic) that has been preheated according to the present invention is introduced to feed hopper 16. The temperature within extruder 10 increases as the plastic resin and any additive (used herein in the singular or plural) added into hopper 16 advances from the near end, where hopper 16 is located, to the terminal end, where a die 18 is located. The plastic and additive melt within the extruder 10 are formed into a homogeneous melt that is extruded through the holes in die 18 as an extrudate. Illustrated in FIG. 1 is an underwater pelletizer 30, which will be described in greater detail herein.

Attention is directed to the feed handling equipment 20 that provides at least one specific piece of equipment that preheats the plastic before entering feed hopper 16. The present invention is independent of any specific piece of feed handling equipment 20. In this embodiment of the present invention, a jacketed blender 21 preheats the plastic entering the process. Hot quench water enters inlet "A" (see FIG. 2) and flows through the jacket of blender 21 heating the plastic being blended in the blender 21. Water exits the jacket of blender 21 through line 22. The warm quench water then passes through a heat exchanger 23. Cold water enters exchanger 23 from inlet "X", controlled by a temperature controller "T", and is removed from exchanger 23 through outlet "Y". The cool quench water exits exchanger 23 by line 24. Line 24 is connected to an inline, underwater, pelletizer device 30. The pelletizer device 30 is characterized by structure that introduces cool water through line 24 into a chamber with a rotating cutter that cuts the extrudate immediately as the extrudate passes through die 18, cooling the cut extrudate as a pellet, and removes the quench water, that is now hot, and the pellets through outlet "B".

While pelletizer device 30 is illustrated as an underwater pelletizer, the present invention is applicable to the full range of pelletizer devices that employ water as part of the quenching medium for the pellet. For example, a strand trough pelletizer system where the extrudate strands extruded through holes in die 18 are drawn through a water trough, like strands of spaghetti, to a pelletizer that cuts the strands into pellets. The water in the trough is heated as the extrudate strands are cooled and this heated water may be used to heat the plastic entering the process.

Figure 2:
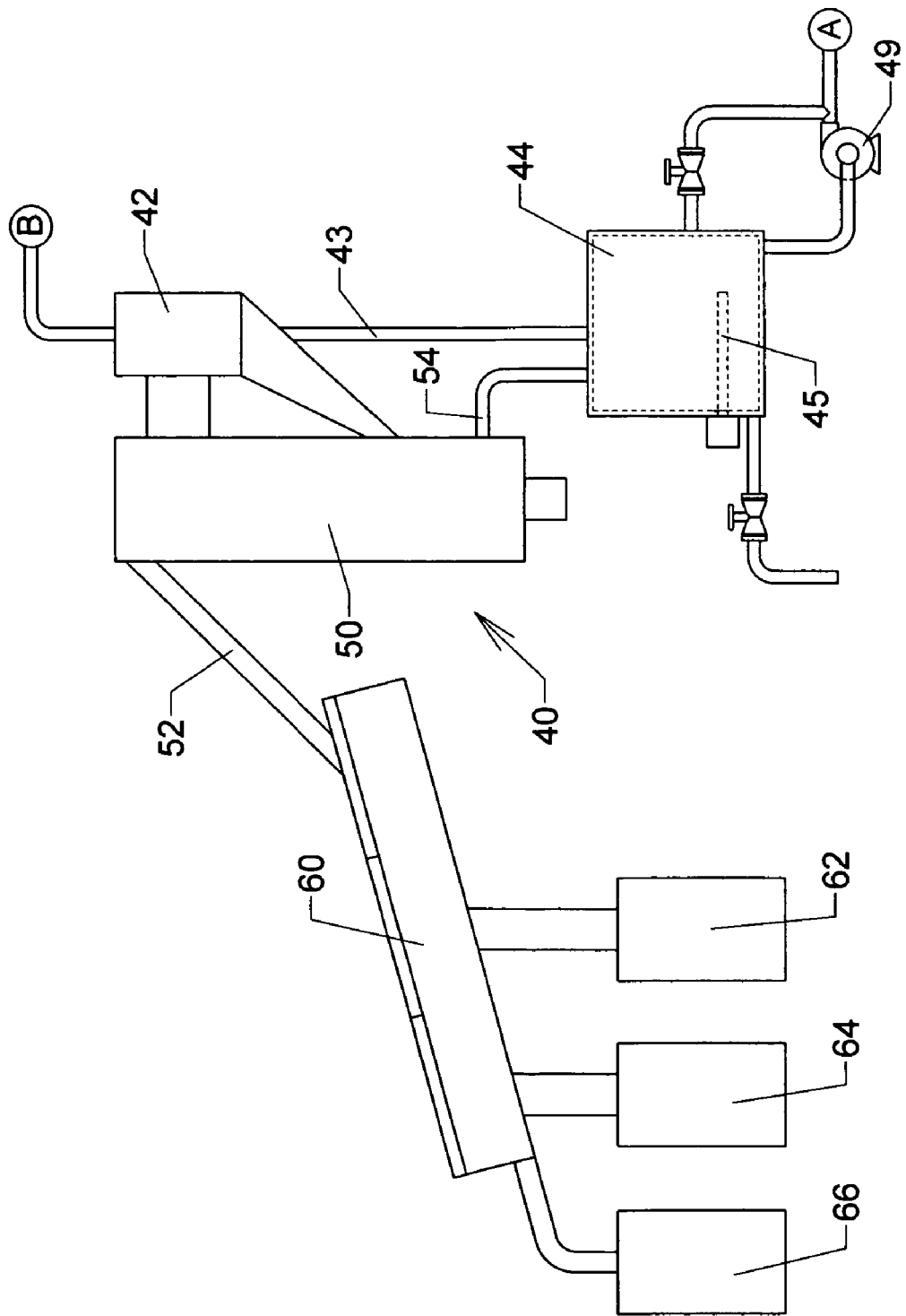
FIG. 2 is a schematic view of one embodiment of pellet recovery equipment according to the present invention.

Referring now to FIG. 2, the hot quench water and pellets enter inlet "A" into equipment 40 for pellet recovery. The slurry of hot water and pellets is fed to a de-watering box 42 where the pellets are separated and the water is passed through line 43 to a water tank 44, collecting the hot water. The pellets are transferred to a drier 50, illustrated by a drier that removes the dried pellets overhead by line 52 and the residual water is removed by line 54 and is added to the water in water tank 44. The dried pellets removed from drier 50 by line 52 are then separated in separator 60, the fines or undersized pieces falling through screens and collected in drum 62, the product pellets in drum 64 and the oversize pieces in drum 66.

Attention is directed to water tank 44, where in the start up of the quench water flow, immersion heater 45 may heat the water to a normal operating temperature. Specific attention is directed to the quench water tank 44, according to the present invention, where the water is pumped by pump 49 to outlet "A", which is inlet "A" (see FIG. 1) for directly flowing through the jacket of blender 21. Thus, the hot quench water is used to heat the plastic entering the process.

Figure 3:
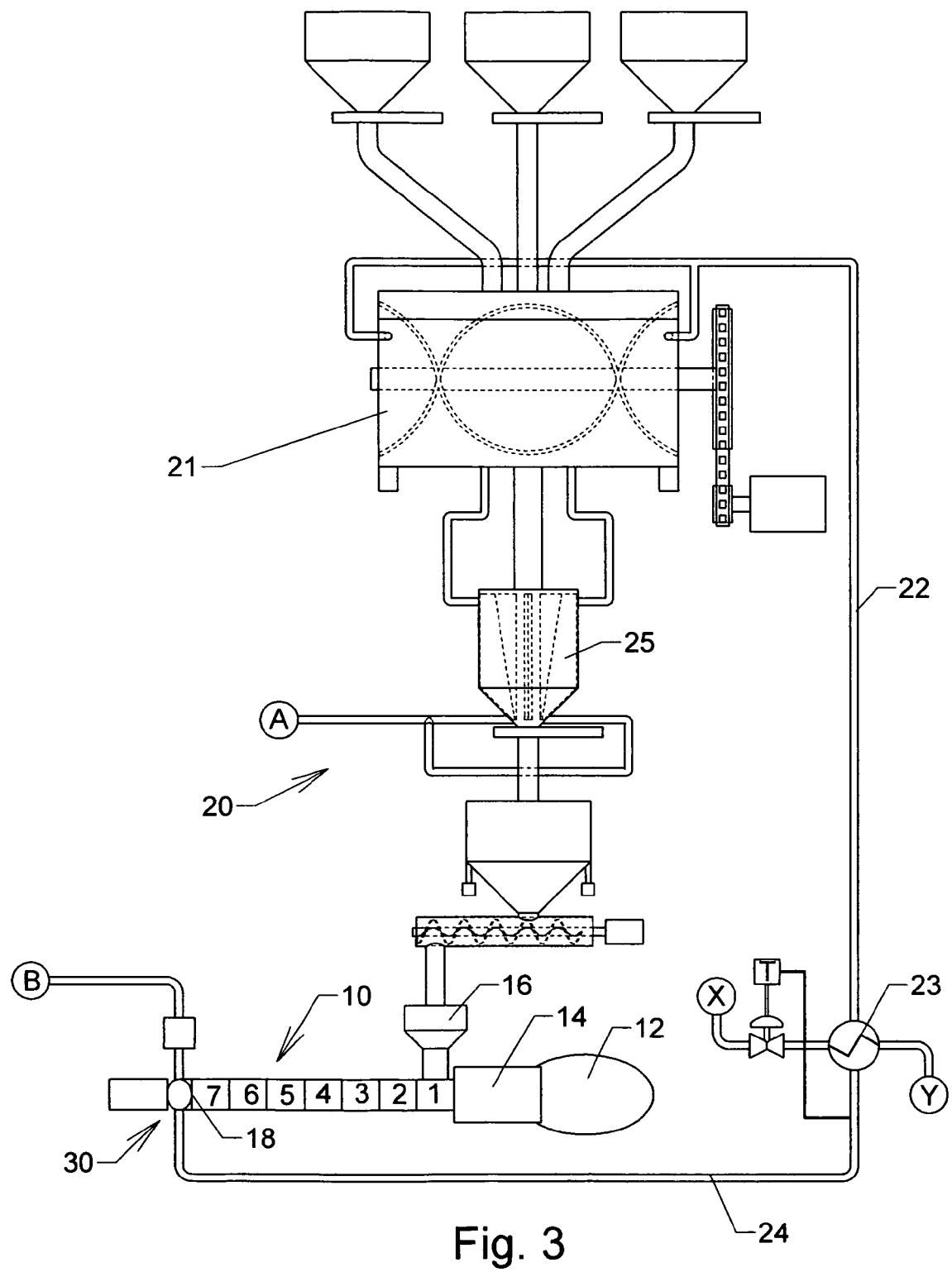
FIG. 3 is a schematic view of another embodiment of plastic feed equipment according to the present invention with additional equipment employed for heat exchange to preheat the plastic entering the process.

Referring to FIG. 3, this embodiment differs from that of the embodiment of FIG. 2 in the number of pieces of feed handing equipment 20 that are used as heat exchangers. Hot quench water enters inlet "A", in this embodiment, below a baffled surge hopper 25. The hot water flows through baffled hopper 25 for heat exchange with the partially heated plastic from blender 21. The water exits hopper 25 and flows into the jacket of blender 21 and is circulated as shown in FIG. 1. The plastic is shown as gravity fed from the feed storage (hoppers located above blender 21) to the blender 21 and then to the hopper 25, each having heat exchange structure for heating the plastic entering the process. It is noted that the plastic need not be in a gravity feed system but may be in a pneumatic system where the feed handling equipment 20 employs the tubes carrying the plastic to be heated by the quench water in structure similar to conventional tube heat exchangers.

Figure 4:
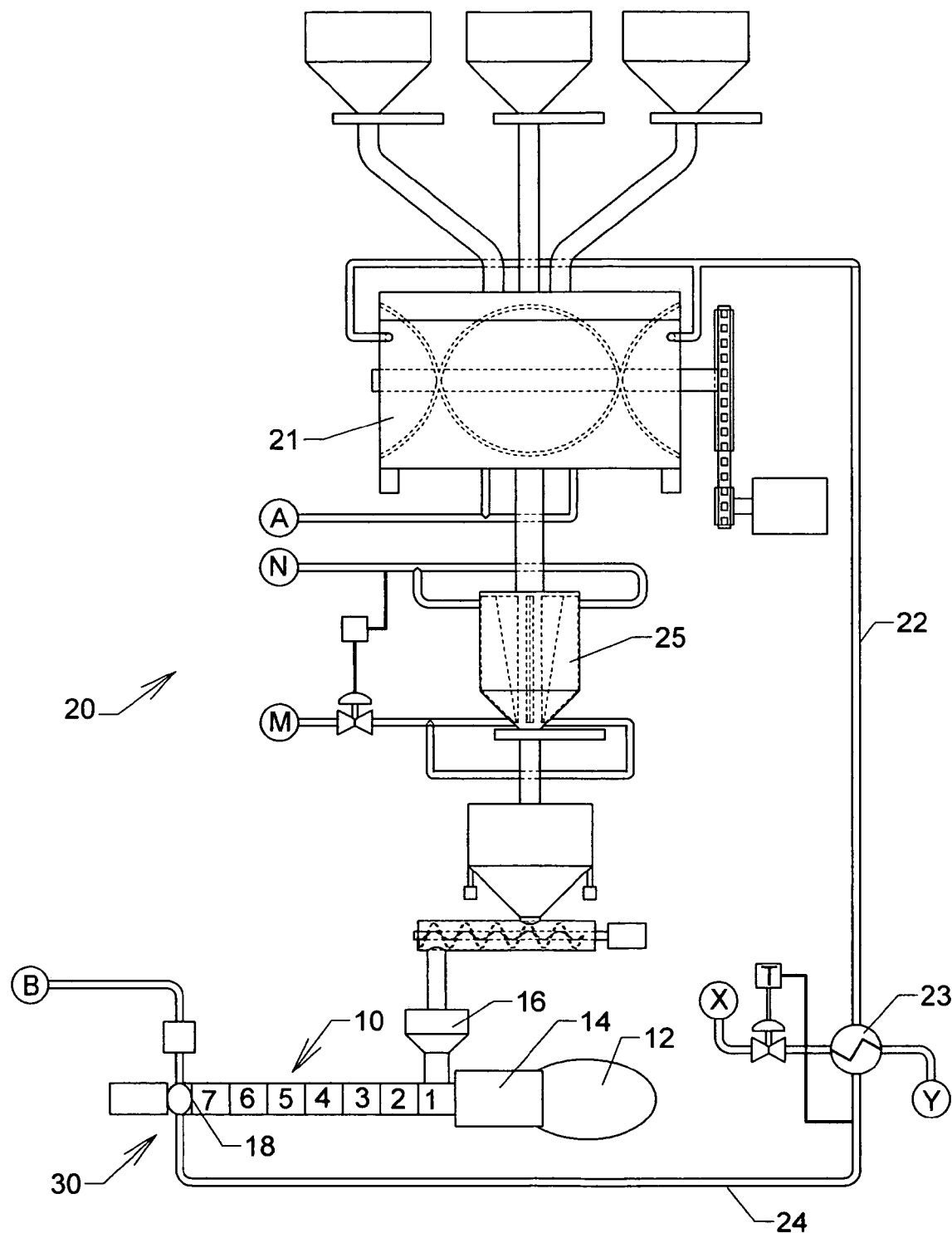
FIG. 4 is a schematic view of an embodiment of plastic feed equipment according to the present invention with an additional source of heat that may be employed for heat exchange to preheat the plastic entering the process

FIG. 4 is still another embodiment of the invention that illustrates that other sources of heat may be used in heating the plastic used in the process. In this embodiment, a source of heat other than the quench water enters inlet "M" and a piece of feed handling equipment 20 adapted for heat exchange with the plastic entering the process. Inlet "M" is shown entering below hopper 25 where the heating fluid flows through baffles in hopper 25 and exits through outlet "N". The fluid entering inlet "M", in contrast to the quench water, may be fluid under pressure and at temperatures above boiling water.

Figure 5:
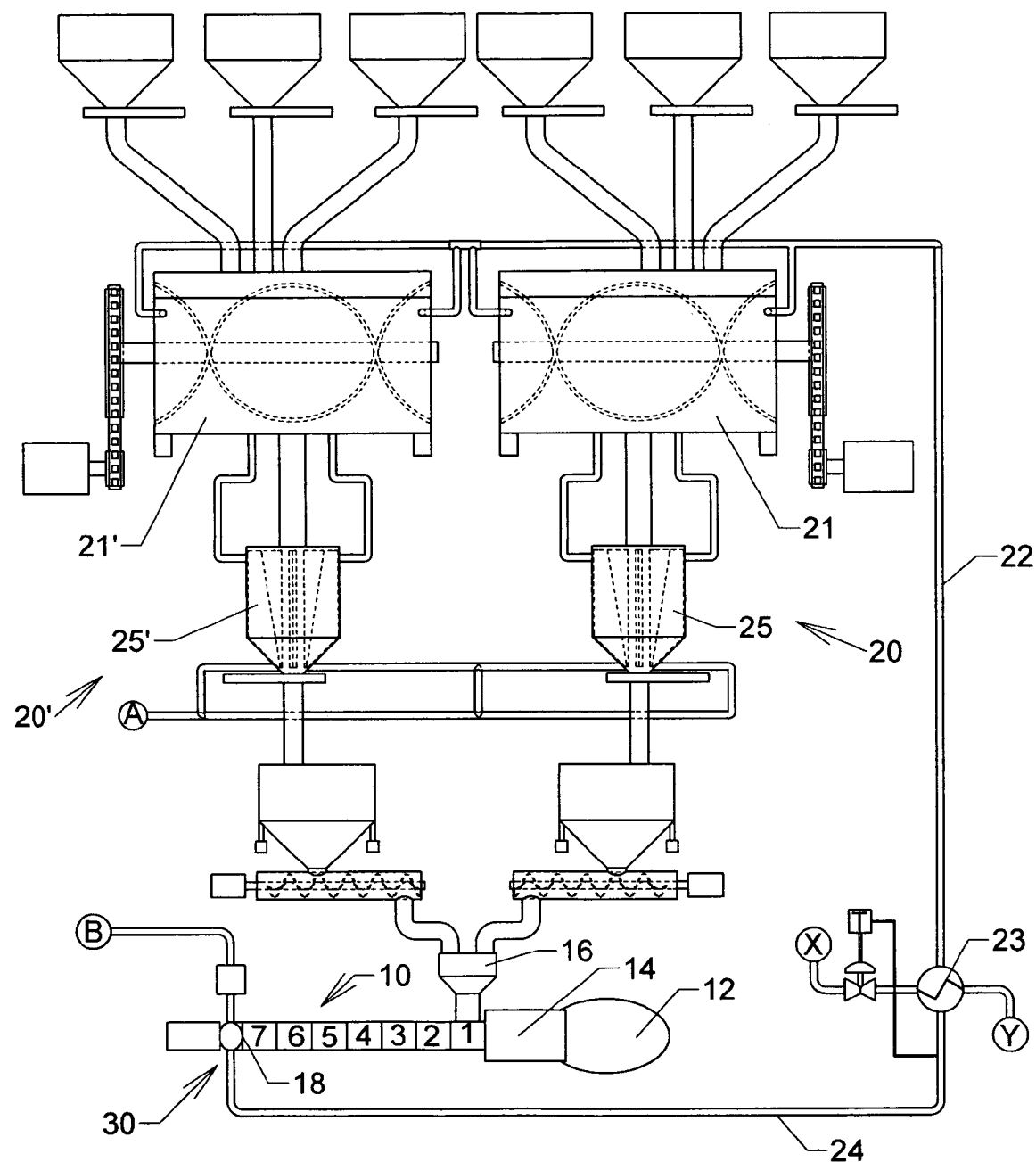
FIG. 5 is a schematic view of an embodiment having more than one feed line that may be employed for heat exchange to preheat the plastic entering the process.
Figure 6:
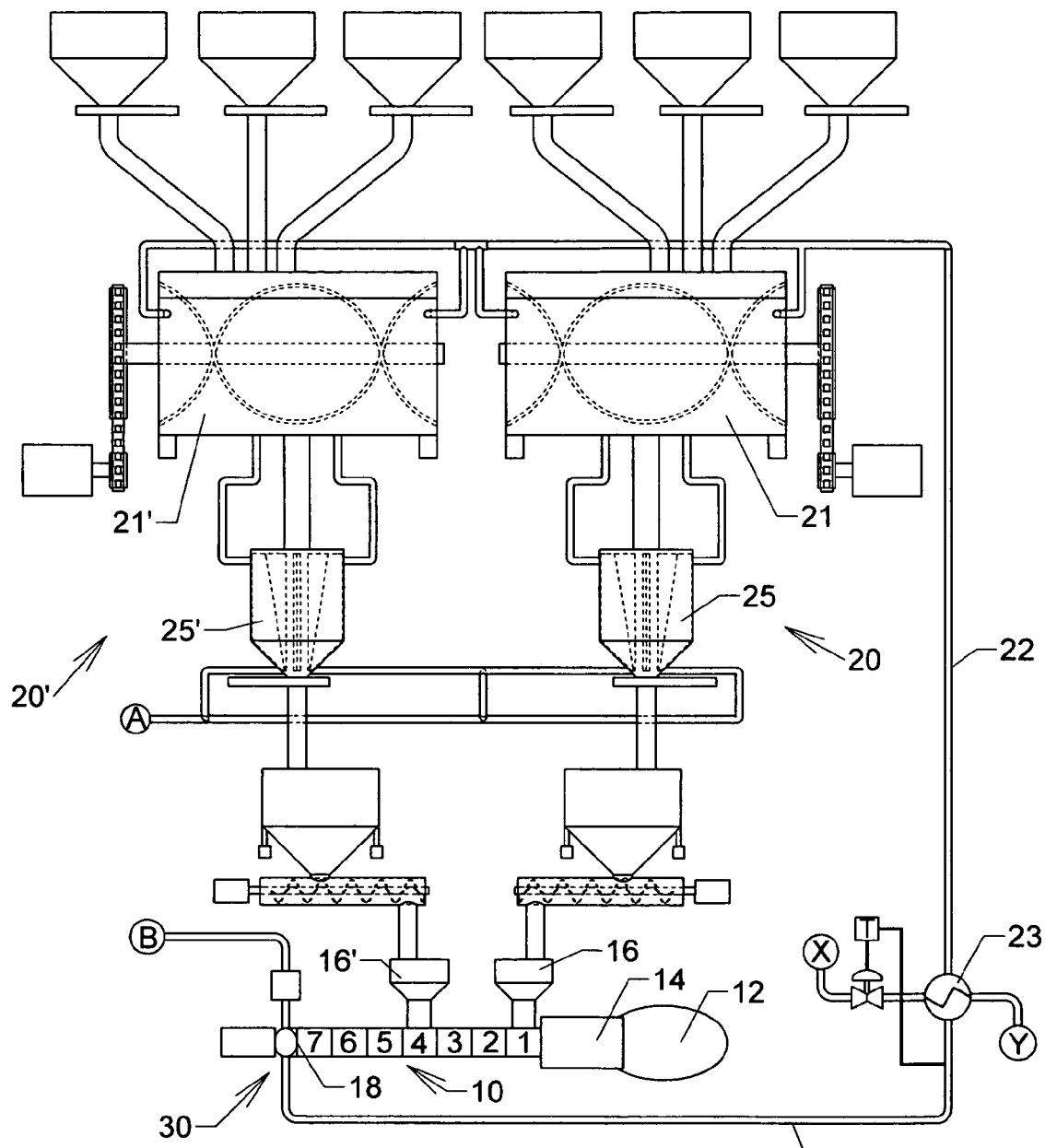
FIG. 6 is a schematic view of an embodiment having more than one feed lines to the extruder.

FIG. 5 illustrates that the feed handling equipment 20 may be in more than one line (20 and 20'). FIG. 6 illustrates two feed handling lines (20 and 20'); however, each line may feed plastic to different hoppers (16 and 16').

In each of the above embodiments where the feed material is pre-heated the thermal efficiency of the extrusion process is significantly improved. The advantage of the present invention, comparing embodiment of FIGS. 1 and 2 with Prior Art, is a reduced utility consumption at fixed capacity—the overall energy (horsepower) required for extrusion is lowered. Another advantage may be increased throughput capacity at fixed utility consumption. Still another advantage may be improved product—reaching the melt phase of the plastic sooner in the extruder, limiting the plastic to the high temperatures of the extruder, leads to less degradation of the plastic and additives. Less degradation leads to significantly improved physical properties of the resulting pellets.

The invention claimed is:

1. Apparatus for compounding plastic resin and additive to form a pellet of said resin and additive comprising:
    an extruder having a feed hopper at the near end and a pelletizer at the terminal end, said pelletizer employing quench water to cool said resin and additive extrudate which heats said quench water; and
    equipment for circulating said heated quench water to heat said plastic resin entering said feed hopper.

2. An apparatus according to claim 1 wherein said equipment is feed handling equipment.

3. An apparatus according to claim 1 wherein said equipment is a jacketed blender.

4. An apparatus according to claim 1 wherein said equipment is a heat exchanger.

5. An apparatus according to claim 2 wherein said plastic is gravity fed.

* * * * *